No. 887,701. PATENTED MAY 12, 1908.
C. J. SCHOENING.
STEERING GEAR.
APPLICATION FILED MAY 4, 1907.
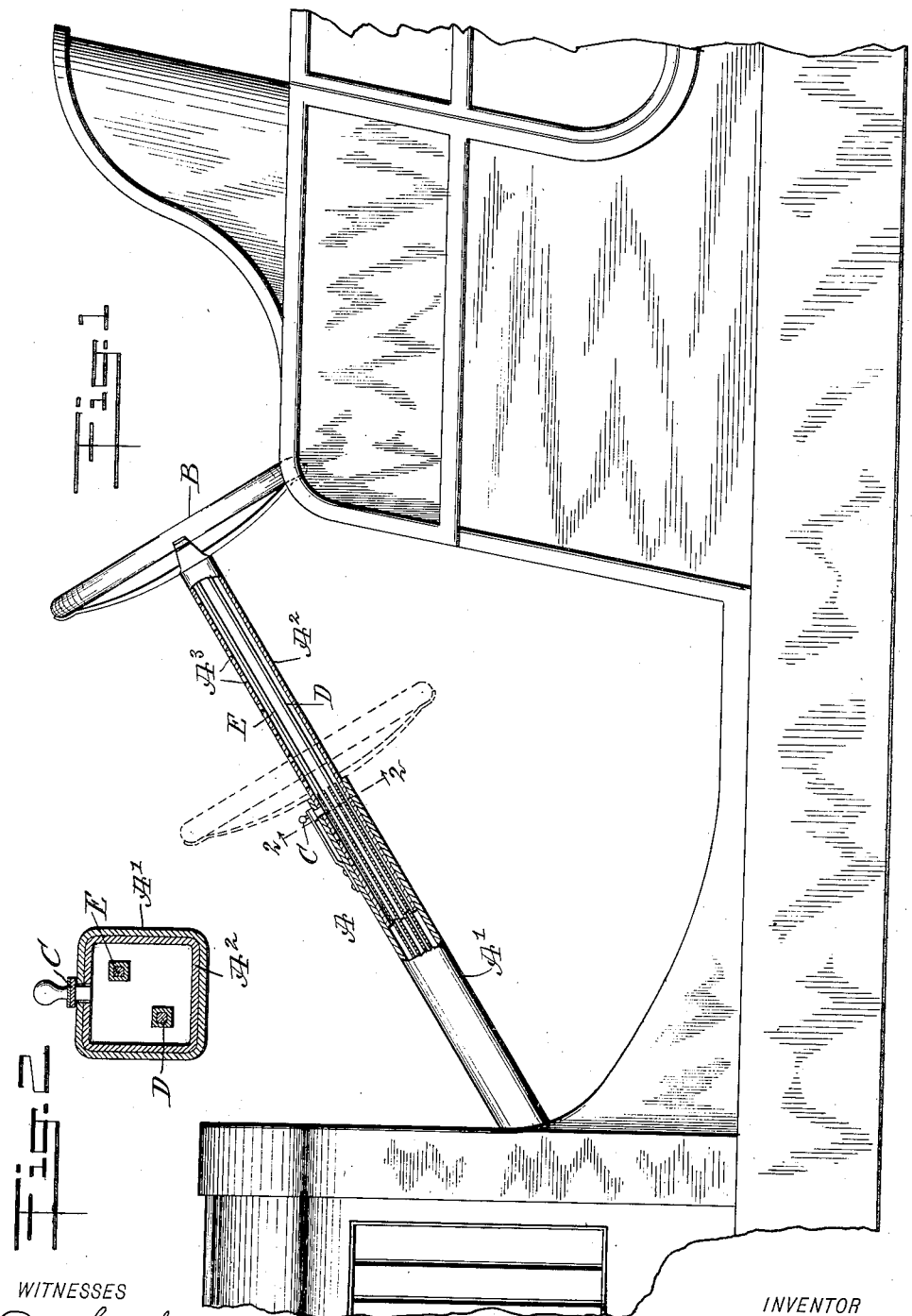
WITNESSES
INVENTOR
Charles J. Schoening
BY Munn & Co.
ATTORNEYS

UNITED STATES PATENT OFFICE.

CHARLES JULIUS SCHOENING, OF HONOLULU, TERRITORY OF HAWAII, ASSIGNOR OF ONE-THIRD TO GEORGE P. COOKE, OF HONOLULU, TERRITORY OF HAWAII.

STEERING-GEAR.

No. 887,701.

Specification of Letters Patent.

Patented May 12, 1908.

Application filed May 4, 1907. Serial No. 371,773.

*To all whom it may concern:*

Be it known that I, CHARLES J. SCHOENING, a citizen of the United States, and a resident of Honolulu, county of Oahu and Territory of Hawaii, have invented a new and Improved Steering-Gear, of which the following is a full, clear, and exact description.

The object of the invention is to provide a new and improved steering gear, more especially designed for use on automobiles, motor boats, air ships and other vehicles, and arranged to bring the steering wheel into position for convenient manipulation by the driver of the motor vehicle and to allow of adjusting the steering column, to permit convenient access to or egress from the driver's seat.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both the views.

Figure 1 is a sectional side elevation of the improvement as applied, and Fig. 2 is an enlarged cross section of the same, on the line 2—2 of Fig. 1.

The steering column A of the steering gear for a motor vehicle is made in hollow sections A', A², of which the section A' is connected at its lower end in the usual manner with the steering gear proper, and the outer and upper end of the section A² is provided with the usual hand wheel B under the control of the driver of the motor vehicle, to properly turn the column with a view to steer the vehicle in the desired direction. The sections A', A² of the steering column are preferably made square in cross section, as plainly indicated in Fig. 2, and the section A² is free to slide or telescope in the section A', and in order to lock the sections A', A² together in any adjusted position a locking device is provided, preferably in the form of a spring latch C held on the upper end of the section A' and adapted to engage one of a series of spaced apertures A³, formed in the other section A². Thus by the arrangement described the driver can move the section A² outward or inward, so as to bring the hand wheel B into the desired position, so as to enable the driver to conveniently manipulate the said wheel. It will also be seen that when the section A² is telescoped in the section A' sufficient space is provided at the driver's seat for the latter to conveniently pass to or from the same.

Although I have shown one form of locking device, it is evident that I do not limit myself to the same.

The spark device D and the throttle control E, arranged within the steering column A, are likewise made in telescoping sections, as plainly indicated in the drawings, so that the several parts are always in the proper active position.

In practice the steering column A may be arranged horizontally or nearly so, or at about an angle of twenty-five to thirty degrees from the horizontal, so that the hand wheel B is in a very good position for the driver to actuate the same while seated in a natural position on the seat. Thus a better control of the machine can be had by the use of this device.

By telescoping the section A² within the section A' the steering wheel B is lowered sufficiently to permit convenient packing and shipping of the motor vehicle from one place to another.

Having thus described my invention, I claim as new and desire to secure by Letters Patent:

1. A steering gear for motor vehicles provided with a steering column made in sections telescoping one in the other, means in connection with the sections for preventing rotary movement thereof with respect to each other and a locking device for locking the sections in the adjusted position.

2. A steering gear for motor vehicles provided with a hollow steering column made in sections, one telescoping in the other, means in connection with the sections for preventing rotary movement thereof with respect to each other, a locking device for fastening the sections together, and a telescoping spark and throttle device within the said column and telescoping with the column sections.

In testimony whereof I have signed my name to this specification in the presence of two subscribing witnesses.

CHARLES JULIUS SCHOENING.

Witnesses:
 CHARLES PHILLIPS,
 JOS. FRIAS.